United States Patent
Bang et al.

(10) Patent No.: US 11,620,297 B2
(45) Date of Patent: Apr. 4, 2023

(54) METHOD AND SYSTEM FOR DATA USAGE ANALYSIS

(71) Applicant: JPMorgan Chase Bank, N.A., New York, NY (US)

(72) Inventors: Deepak Bang, Plano, TX (US); Jeffrey Hargrave, Cedar Grove, NJ (US); Nissim Nathan Dany, Roseland, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 342 days.

(21) Appl. No.: 16/801,813

(22) Filed: Feb. 26, 2020

(65) Prior Publication Data

US 2021/0263925 A1   Aug. 26, 2021

(51) Int. Cl.
  *G06F 16/2458*   (2019.01)
  *G06N 5/04*   (2023.01)

(52) U.S. Cl.
  CPC ........... *G06F 16/2465* (2019.01); *G06N 5/04* (2013.01)

(58) Field of Classification Search
  CPC ............................... G06F 16/2465; G06N 5/04
  See application file for complete search history.

(56) References Cited

U.S. PATENT DOCUMENTS

| | | | |
|---|---|---|---|
| 9,275,065 B1* | 3/2016 | Ganesh | G06F 21/556 |
| 9,298,914 B1* | 3/2016 | McCorkendale | G06F 21/552 |
| 9,961,082 B2* | 5/2018 | Chanda | G06F 21/6218 |
| 10,425,435 B1* | 9/2019 | Kayyoor | H04L 63/104 |
| 2019/0065298 A1* | 2/2019 | Leverich | G06F 11/079 |

* cited by examiner

*Primary Examiner* — Kris E Mackes
(74) *Attorney, Agent, or Firm* — Greenblum & Bernstein, P.L.C.

(57) ABSTRACT

A method and a computing apparatus for analyzing data usage are provided. The method includes: accessing a data set; identifying at least one user that has accessed the data set within a predetermined time interval; determining a number of times that the identified user accessed the data set during the predetermined time interval; and outputting an identification of the user in conjunction with information identifying the data set and information indicating the determined number of times of accessing the data set. The method may further include determining a data set-specific data usage pattern that indicates usage frequency information that relates to the data set, and outputting information that relates to the determined data set-specific data usage pattern.

16 Claims, 4 Drawing Sheets

METHOD AND SYSTEM FOR DATA USAGE ANALYSIS

BACKGROUND

1. Field of the Disclosure

This technology generally relates to methods and systems for analyzing data usage, and more particularly, to methods and systems for aggregating, mining, and analyzing data usage patterns and trends.

2. Background Information

Many organizational systems and functions collect large amounts of data and rely on databases and data repositories for operational efficiency and functionality. Conventional database tools typically focus on monitoring and performance of database systems.

In many instances, a database owner may be interested in information that relates to usage of the data contained in a particular database. For example, a database owner may desire to know who is accessing the data, when and/or how often is the data being accessed, and which specific portions of the data are being accessed. Such information may be valuable, in order to increase confidence in confirming impacted users with respect to change management and incident management.

Accordingly, there is a need for a tool that enables database owners to efficiently and accurately analyze data usage patterns and trends.

SUMMARY

The present disclosure, through one or more of its various aspects, embodiments, and/or specific features or sub-components, provides, inter alia, various systems, servers, devices, methods, media, programs, and platforms for aggregating, mining, and analyzing data usage patterns and trends.

According to an aspect of the present disclosure, a method for analyzing data usage is provided. The method is implemented by at least one processor. The method includes: accessing, by the at least one processor, a first data set; identifying, by the at least one processor, at least one user that has accessed the first data set within a predetermined time interval; determining, by the at least one processor, a number of times that the identified at least one user accessed the first data set during the predetermined time interval; and outputting, by the at least one processor, an identification of the at least one user in conjunction with information identifying the first data set and information indicating the determined number of times of accessing the first data set.

The identifying may include identifying all users that have accessed the first data set within the predetermined time interval.

The method may further include determining, by the at least one processor, a data set-specific data usage pattern that indicates usage frequency information that relates to the first data set; and outputting information that relates to the determined data set-specific data usage pattern.

The method may further include: using, by the at least one processor, the determined data set-specific data usage pattern to predict an accessing of the first data set by at least a predetermined number of users; and when the predicted accessing by the at least predetermined number of users does not occur, outputting, by the at least one processor, a notification that indicates a data usage anomaly.

The method may further include: identifying, by the at least one processor, a second data set that has been accessed by the at least one user during the predetermined time interval; determining, by the at least one processor, a number of times that the identified at least one user accessed the second data set during the predetermined time interval; and outputting, by the at least one processor, an identification of the at least one user in conjunction with information identifying the second data set and information indicating the determined number of times of accessing the second data set.

The method may further include: identifying all users that have accessed the first data set within the predetermined time interval; and identifying all users that have accessed the second data set within the predetermined time interval.

The method may further include: identifying at least one additional data set that has been accessed by the at least one user during the predetermined time interval; and outputting an identification of the at least one user in conjunction with information identifying each of the at least one additional data set.

The method may further include: determining, by the at least one processor, a user-specific data usage pattern that indicates usage frequency information that relates to all of the first data set, the second data set, and the at least one additional data set for the at least one user; and outputting information that relates to the determined user-specific data usage pattern.

The method may further include: using, by the at least one processor, the determined user-specific data usage pattern to predict an accessing of at least one of the fist data set, the second data set, and the at least one additional data set by the at least one user; and when the predicted accessing by the at least one user does not occur, outputting, by the at least one processor, a notification that indicates a data usage anomaly.

According to another aspect of the present disclosure, a computing apparatus for analyzing data usage is provided. The computing apparatus includes a processor, a memory, and a communication interface coupled to each of the processor and the memory. The processor is configured to: access a first data set; identify at least one user that has accessed the first data set within a predetermined time interval; determine a number of times that the identified at least one user accessed the first data set during the predetermined time interval; and output an identification of the at least one user in conjunction with information identifying the first data set and information indicating the determined number of times of accessing the first data set.

The processor may be further configured to identify all users that have accessed the first data set within the predetermined time interval.

The processor may be further configured to: determine a data set-specific data usage pattern that indicates usage frequency information that relates to the first data set; and output information that relates to the determined data set-specific data usage pattern.

The processor may be further configured to: use the determined data set-specific data usage pattern to predict an accessing of the first data set by at least a predetermined number of users; and when the predicted accessing by the at least predetermined number of users does not occur, output a notification that indicates a data usage anomaly.

The processor may be further configured to: identify a second data set that has been accessed by the at least one user during the predetermined time interval; determine a number of times that the identified at least one user accessed the second data set during the predetermined time interval; and output an identification of the at least one user in conjunction with information identifying the second data set and information indicating the determined number of times of accessing the second data set.

The processor may be further configured to: identify all users that have accessed the first data set within the predetermined time interval; and identify all users that have accessed the second data set within the predetermined time interval.

The processor may be further configured to: identify at least one additional data set that has been accessed by the at least one user during the predetermined time interval; and output an identification of the at least one user in conjunction with information identifying each of the at least one additional data set.

The processor may be further configured to: determine a user-specific data usage pattern that indicates usage frequency information that relates to all of the first data set, the second data set, and the at least one additional data set for the at least one user; and output information that relates to the determined user-specific data usage pattern.

The processor may be further configured to: use the determined user-specific data usage pattern to predict an accessing of at least one of the fist data set, the second data set, and the at least one additional data set by the at least one user; and when the predicted accessing by the at least one user does not occur, output a notification that indicates a data usage anomaly.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
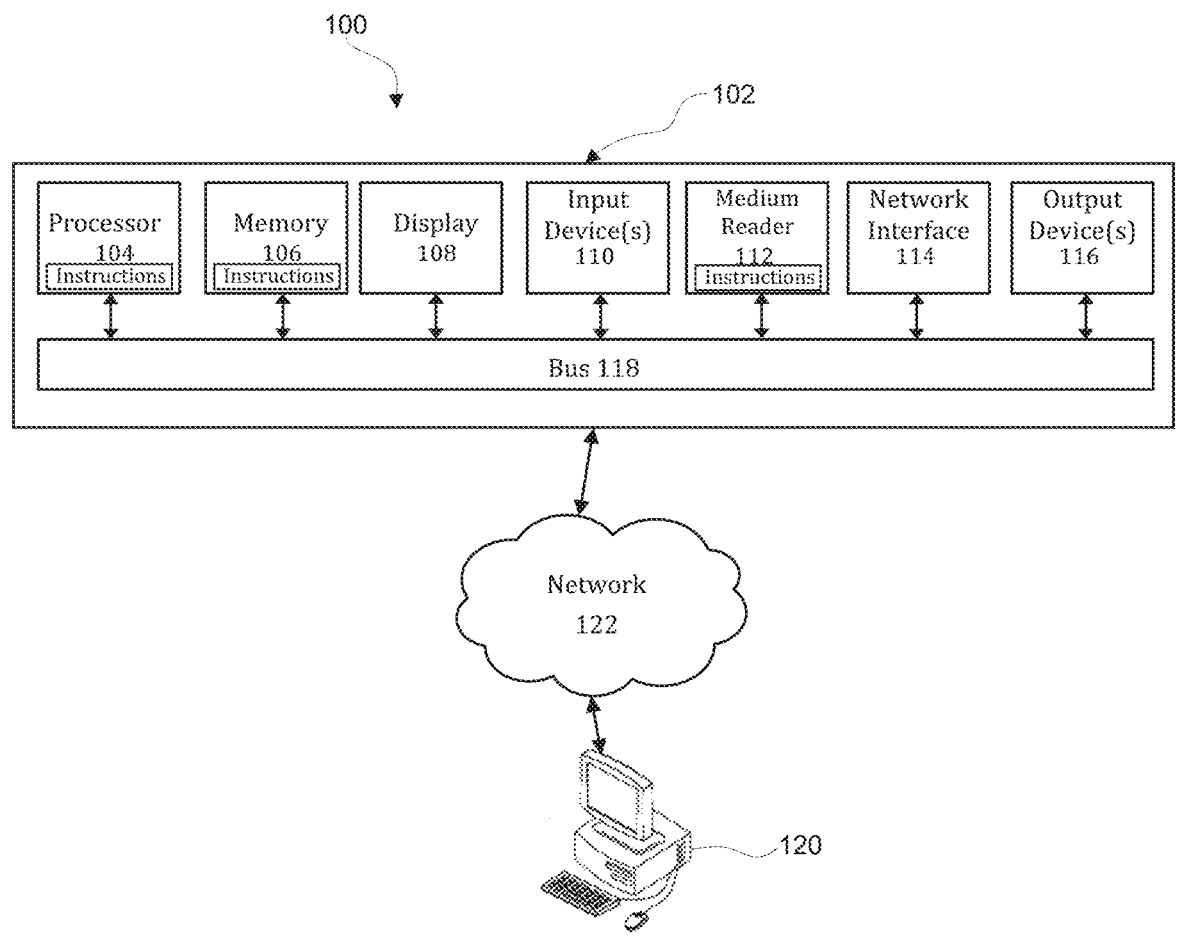
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized methods and systems for aggregating, mining, and analyzing data usage patterns and trends.

Figure 2:
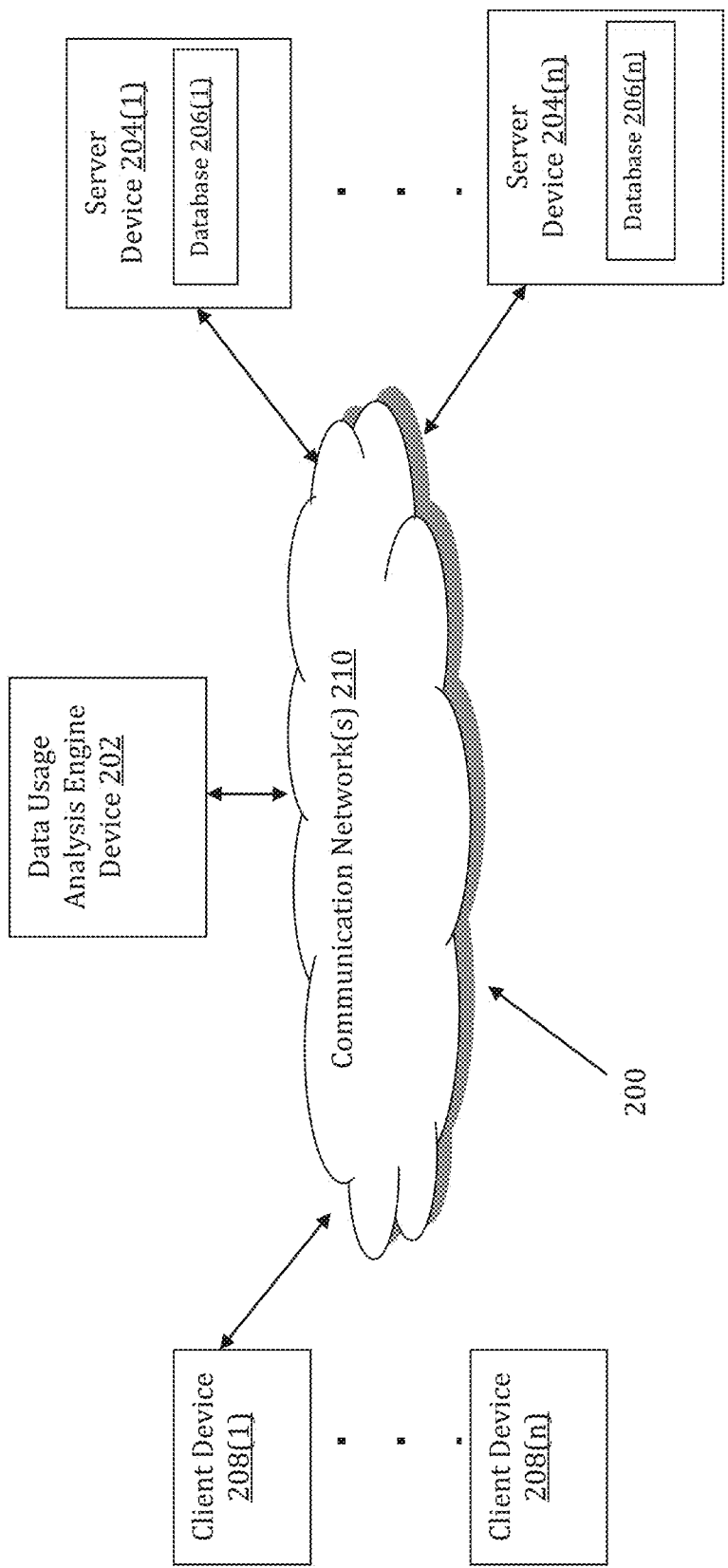
FIG. 2 illustrates an exemplary diagram of a network environment.

Referring to FIG. 2, a schematic of an exemplary network environment 200 for implementing a method for aggregating, mining, and analyzing data usage patterns and trends is illustrated. In an exemplary embodiment, the method is executable on any networked computer platform, such as, for example, a personal computer (PC).

The method for aggregating, mining, and analyzing data usage patterns and trends may be implemented by a Data Usage Analysis Engine (DUAE) device 202. The DUAE device 202 may be the same or similar to the computer system 102 as described with respect to FIG. 1. The DUAE device 202 may store one or more applications that can include executable instructions that, when executed by the DUAE device 202, cause the DUAE device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DUAE device 202 itself, may be located in virtual server(s) running in a cloud-based computing environment rather than being tied to one or more specific physical network computing devices. Also, the application(s) may be running in one or more virtual machines (VMs) executing on the DUAE device 202. Additionally, in one or more embodiments of this technology, virtual machine(s) running on the DUAE device 202 may be managed or supervised by a hypervisor.

In the network environment 200 of FIG. 2, the DUAE device 202 is coupled to a plurality of server devices 204(1)-204(n) that hosts a plurality of databases 206(1)-206(n), and also to a plurality of client devices 208(1)-208(n) via communication network(s) 210. A communication interface of the DUAE device 202, such as the network interface 114 of the computer system 102 of FIG. 1, operatively couples and communicates between the DUAE device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DUAE device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DUAE devices that efficiently implement a method for aggregating, mining, and analyzing data usage patterns and trends.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DUAE device 202 may be a standalone device or integrated with one or more other devices or apparatuses, such as one or more of the server devices 204(1)-204(n), for example. In one particular example, the DUAE device 202 may include or be hosted by one of the server devices 204(1)-204(n), and other arrangements are also possible. Moreover, one or more of the devices of the DUAE device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(l)-204(n) in this example may process requests received from the DUAE device 202 via the communication network(s) 210 according to the HTTP-based and/or JavaScript Object Notation (JSON) protocol, for example, although other protocols may also be used.

The server devices 204(l)-204(n) may be hardware or software or may represent a system with multiple servers in a pool, which may include internal or external networks. The server devices 204(1)-204(n) hosts the databases 206(1)-206(n) that are configured to store historical data usage data, such as database-specific access frequency data and access data for specific sets of data within individual databases, and user-specific usage pattern data, which includes data that indicates identifications of users that have accessed and user-specific access frequencies and patterns.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(l)-208(n) in this example may include any type of computing device that can interact with the DUAE device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DUAE device 202 via the communication network(s) 210 in order to communicate user requests and information. The client devices 208(l)-208(n) may further include, among other features, a display device, such as a display screen or touchscreen, and/or an input device, such as a keyboard, for example.

Although the exemplary network environment 200 with the DUAE device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DUAE device 202, the server devices 204(1)-204(n), or the client devices 208(1)-208(n), for example, may be configured to operate as virtual instances on the same physical machine. In other words, one or more of the DUAE device 202, the server devices 204(1)-204(n), or the client devices 208(1)-208(n) may operate on the same physical device rather than as separate devices communicating through communication network(s) 210. Additionally, there may be more or fewer DUAE devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
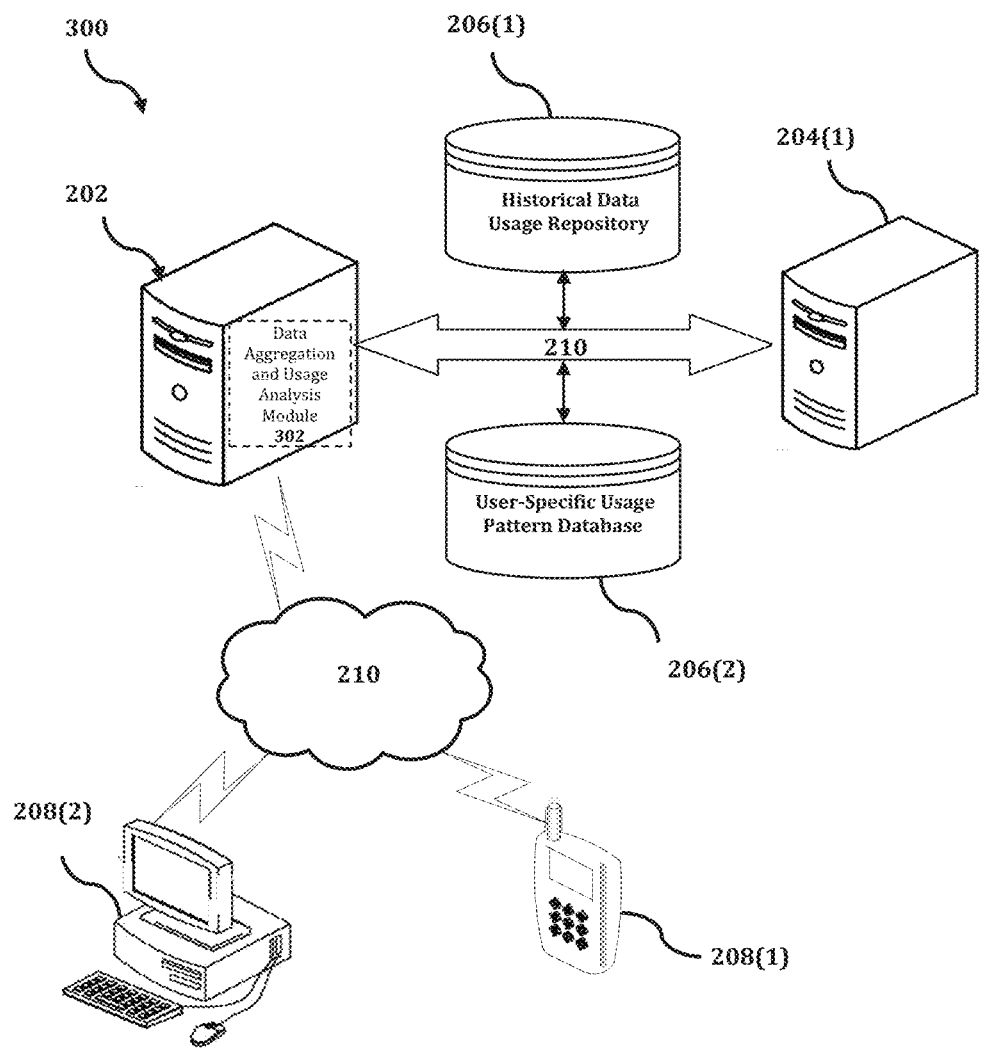
FIG. 3 shows an exemplary system for implementing a method for aggregating, mining, and analyzing data usage patterns and trends.

The DUAE device 202 is described and shown in FIG. 3 as including a data aggregation and usage analysis module 302, although it may include other rules, policies, modules, databases, or applications, for example. As will be described below, the data aggregation and usage analysis module 302 is configured to implement a method for aggregating, mining, and analyzing data usage patterns and trends in an automated, efficient, scalable, and reliable manner.

An exemplary process 300 for implementing a method for aggregating, mining, and analyzing data usage patterns and trends by utilizing the network environment of FIG. 2 is shown as being executed in FIG. 3. Specifically, a first client device 208(1) and a second client device 208(2) are illustrated as being in communication with DUAE device 202. In this regard, the first client device 208(1) and the second client device 208(2) may be "clients" of the DUAE device 202 and are described herein as such. Nevertheless, it is to be known and understood that the first client device 208(1) and/or the second client device 208(2) need not necessarily be "clients" of the DUAE device 202, or any entity described in association therewith herein. Any additional or alternative relationship may exist between either or both of the first client device 208(1) and the second client device 208(2) and the DUAE device 202, or no relationship may exist.

Further, DUAE device 202 is illustrated as being able to access a historical data usage repository 206(1) and a user-specific usage pattern database 206(2). The data aggregation and usage analysis module 302 may be configured to access these databases for implementing a method for aggregating, mining, and analyzing data usage patterns and trends.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DUAE device 202 via broadband or cellular communication. Of course, these embodiments are merely exemplary and are not limiting or exhaustive.

Upon being started, the derivatives and securities portfolio management module 302 executes a process for aggregating, mining, and analyzing data usage patterns and trends. An exemplary process for aggregating, mining, and analyzing data usage patterns and trends is generally indicated at flowchart 400 in FIG. 4.

Figure 4:
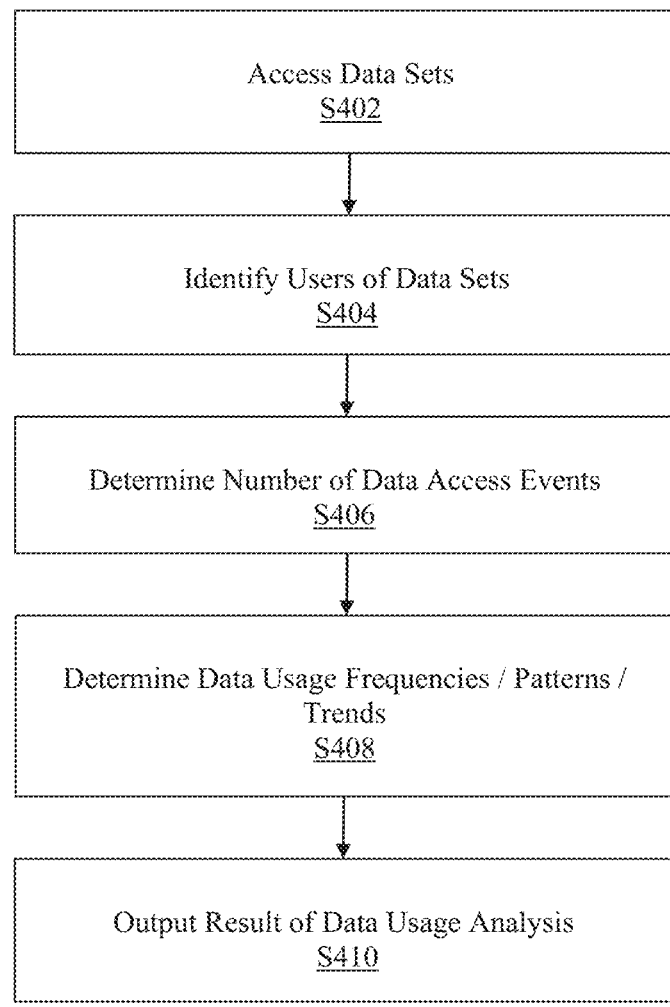
FIG. 4 is a flowchart of an exemplary process for implementing a method for aggregating, mining, and analyzing data usage patterns and trends.

In the process 400 of FIG. 4, at step S402, the data aggregation and usage analysis module 302 accesses one or more data sets of interest. In an exemplary embodiment, the data sets may be selected from among a plurality of data sets that are respectively owned by various database owners.

At step S404, the data aggregation and usage analysis module 302 identifies users that have accessed any one or more of the data sets within a predetermined time interval. In an exemplary embodiment, the predetermined interval may be an hour, a number of hours, a day, a number of days, a week, a number of weeks, a month, a number of months, or any other suitable interval. In an exemplary embodiment, the users that have accessed the data sets may be identified by individual name, email address, organizational name or identifier, or any other suitable form of identification.

At step S406, the data aggregation and usage analysis module 302 determines a number of data access events. In an exemplary embodiment, the determination of the number of data access events includes a computation of a number of data retrievals for each data set of interest by all users.

At step S408, the data aggregation and usage analysis module 302 analyzes the data relating to identified users, numbers of data access events, and frequently accessed data sets to determine data usage patterns and/or trends. In an exemplary embodiment, the data usage analysis may produce a result that indicates a frequency at which a particular data set is accessed by a particular user, or a pattern of accessing certain data sets by a user or by multiple users.

At step S410, the data aggregation and usage analysis module 302 outputs a result of the data usage analysis. For example, the result may be shown as a display on a user's computer screen or smart phone; the result may be presented as a web page; and/or the result may be transmitted as an email to a subscriber.

In an exemplary embodiment, the data aggregation and usage analysis module 302 may use the results of the data usage analysis to make predictions about future events that entail accessing particular data sets at particular times by particular users. When a prediction about a particular data set being accessed by a given user is subsequently determined to be incorrect, the data aggregation and usage analysis module 302 interpret the incorrect prediction as an anomaly, and may output a notification that indicates the occurrence of an anomaly.

In an exemplary embodiment, when a particular data set that is frequently accessed by one or more particular users is modified, the data aggregation and usage analysis module 302 may output a notification that relates to the modification. In this manner, the data aggregation and usage analysis module 302 may provide an informational benefit to users that frequently access certain data sets.

Accordingly, with this technology, an optimized process for implementing methods and systems for aggregating, mining, and analyzing data usage patterns and trends is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for analyzing data usage, the method being implemented by a data usage analysis engine including a data aggregation and usage analysis module and having at least one processor, the method comprising:

accessing, by the data usage analysis engine
a historic data usage repository storing historical data usage data including
database-specific access frequency data about the frequency with which plural users access the database, and
access data about access of specific sets of data including a first data set within individual databases, and
a user-specific usage pattern database storing user-specific usage pattern data, which includes
data that identifies users of the plural users that have accessed the first data set, and
user-specific access frequencies and patterns with which each of the plural users accesses the first data set;
accessing by the data aggregation and usage analysis module the first data set;
identifying, by the data aggregation and usage analysis module, the plural users that have accessed the first data set within a predetermined time interval by email address or organizational name;
determining, by the data aggregation and usage analysis module, a number of times that each of the identified plural users accessed the first data set during the predetermined time interval;
analyzing by the data aggregation and usage analysis module the identified users, and the number of data access events for the first data set, to determine a first-data-set, plural-users usage pattern of the patterns with which the plural users access the first data set;
outputting, by the data aggregation and usage analysis module, to a display of a computer screen or a smart phone, the result of the analyzing and displaying on the computer screen or the smart phone the pattern of access of the first data set by the plural users based on the number of access events for the first data set by the plural users.

2. The method of claim 1, wherein the identifying comprises identifying all users that have accessed the first data set within the predetermined time interval.

3. The method of claim 1, further comprising:
using, by the at least one processor, the determined first-data-set, plural-users usage pattern to predict an accessing of the first data set by at least a predetermined number of users; and
when the predicted accessing by the at least predetermined number of users does not occur, outputting, by the at least one processor, a notification that indicates a data usage anomaly.

4. The method of claim 1, further comprising:
identifying, by the at least one processor, a second data set that has been accessed by the plural users during the predetermined time interval;
determining, by the at least one processor, a number of times that the identified plural users accessed the second data set during the predetermined time interval; and
outputting, by the at least one processor, an identification of the plural users in conjunction with information identifying the second data set and information indicating the determined number of times of accessing the second data set.

5. The method of claim 4, further comprising:
identifying all users that have accessed the first data set within the predetermined time interval; and
identifying all users that have accessed the second data set within the predetermined time interval.

6. The method of claim 4, further comprising:
identifying at least one additional data set that has been accessed by the plural users during the predetermined time interval; and
outputting an identification of the plural users at least in conjunction with information identifying each of the at least one additional data set.

7. The method of claim 6, further comprising:
determining, by the at least one processor, a user-specific data usage pattern that indicates usage frequency information that relates to all of the first data set, the second data set, and the at least one additional data set for each of the plural users; and
outputting information that relates to the determined user-specific data usage pattern.

8. The method of claim 7, further comprising:
using, by the at least one processor, the determined user-specific data usage pattern to predict an accessing of at least one of the first data set, the second data set, and the at least one additional data set by the plural users; and
when the predicted accessing by the plural users does not occur, outputting, by the at least one processor, a notification that indicates a data usage anomaly.

9. A computing apparatus for analyzing data usage, the computing apparatus comprising:
a data usage analysis engine including a data aggregation and usage analysis module and having a processor;
a memory; and
a communication interface coupled to each of the processor and the memory,
wherein the data usage analysis engine is configured to access
a historic data usage repository storing historical data usage data including
database-specific access frequency data about the frequency that plural users access the database, and
access data about access of specific sets of data including a first data set within individual databases, and
a user-specific usage pattern database storing user-specific usage pattern data, which includes
data that identifies users of the plural users that have accessed the first data set, and
user-specific access frequencies and patterns with which each of the plural users access a first data set;
wherein the data aggregation and usage analysis module is configured to
access the first data set;
identify plural users that have accessed the first data set within a predetermined time interval by email address or organizational name;

determine a number of times that each of the identified plural users accessed the first data set during the predetermined time interval;

analyze the identified users, and the number of data access events for the first data set, to determine a first-data-set, plural-users usage pattern of the patterns with which the plural users access the first data set;

output to a display of a computer screen or a smart phone, the result of the analyzing and display on the computer screen or the smart phone the pattern of access of the first data set by the plural users based on the number of access events for the first data set by the plural users.

10. The computing apparatus of claim 9, wherein the processor is further configured to identify all users that have accessed the first data set within the predetermined time interval.

11. The computing apparatus of claim 9, wherein the processor is further configured to:

use the first-data-set, plural-users usage pattern to predict an accessing of the first data set by at least a predetermined number of users; and when the predicted accessing by the at least predetermined number of users does not occur, output a notification that indicates a data usage anomaly.

12. The computing apparatus of claim 9, wherein the processor is further configured to:

identify a second data set that has been accessed by the plural users during the predetermined time interval;

determine a number of times that the identified plural users accessed the second data set during the predetermined time interval; and output an identification of the plural users in conjunction with information identifying the second data set and information indicating the determined number of times of accessing the second data set.

13. The computing apparatus of claim 12, wherein the processor is further configured to:

identify all users that have accessed the first data set within the predetermined time interval; and identify all users that have accessed the second data set within the predetermined time interval.

14. The computing apparatus of claim 12, wherein the processor is further configured to:

identify at least one additional data set that has been accessed by the plural users during the predetermined time interval; and output an identification of the plural users in conjunction with information identifying each of the at least one additional data set.

15. The computing apparatus of claim 14, wherein the processor is further configured to:

determine a user-specific data usage pattern that indicates usage frequency information that relates to all of the first data set, the second data set, and the at least one additional data set for each of the plural users; and output information that relates to the determined user-specific data usage pattern.

16. The computing apparatus of claim 15, wherein the processor is further configured to:

use the determined user-specific data usage pattern to predict an accessing of at least one of the first data set, the second data set, and the at least one additional data set by the plural users; and when the predicted accessing by the plural users does not occur, output a notification that indicates a data usage anomaly.

* * * * *